(12) United States Patent
Tipper et al.

(10) Patent No.: US 9,104,084 B2
(45) Date of Patent: Aug. 11, 2015

(54) GAIN CONTROL FOR AN OPTICAL MODULATOR

(75) Inventors: Alan Tipper, Swindon (GB); Amyas Holroyd, Paignton (GB)

(73) Assignee: Oclaro Technology Limited, Northamptonshire (GB)

( * ) Notice: Subject to any disclaimer, the term of this patent is extended or adjusted under 35 U.S.C. 154(b) by 508 days.

(21) Appl. No.: 13/551,514

(22) Filed: Jul. 17, 2012

(65) Prior Publication Data

US 2013/0022306 A1 Jan. 24, 2013

(30) Foreign Application Priority Data

Jul. 18, 2011 (GB) .................................... 1112348.6

(51) Int. Cl.
*H04B 10/50* (2013.01)
*G02F 1/225* (2006.01)
*H04B 10/556* (2013.01)

(52) U.S. Cl.
CPC ............ *G02F 1/225* (2013.01); *H04B 10/5053* (2013.01); *H04B 10/50575* (2013.01); *H04B 10/50577* (2013.01); *H04B 10/5561* (2013.01); *G02F 2201/16* (2013.01); *G02F 2201/18* (2013.01)

(58) Field of Classification Search
CPC ................... G02F 2001/212; H04B 10/50575; H04B 10/50577
See application file for complete search history.

(56) References Cited

U.S. PATENT DOCUMENTS

| 2006/0263098 | A1* | 11/2006 | Akiyama et al. ............... 398/188 |
| 2009/0003840 | A1 | 1/2009 | Nahapetian et al. |
| 2009/0115544 | A1 | 5/2009 | Kershteyn et al. |
| 2009/0214150 | A1* | 8/2009 | Doerr ................................ 385/3 |
| 2010/0129088 | A1 | 5/2010 | Akasaka et al. |

FOREIGN PATENT DOCUMENTS

| EP | 2323287 A1 | 5/2011 |
| WO | 2006137828 A2 | 12/2006 |

OTHER PUBLICATIONS

United Kingdom search report for application No. GB1112348.6 dated Sep. 14, 2011.

* cited by examiner

*Primary Examiner* — Nathan Curs
(74) *Attorney, Agent, or Firm* — Fenwick & West LLP

(57) ABSTRACT

There is described an optical modulation system for transmitting modulated optical light. The system comprises an electro-optic modulator having at least two arms through which light is transmitted and an imbalance electrode located on at least one arm. A current source is configured to inject current into the imbalance electrode for modifying the phase of light passing through the arm. A dither generator is configured to modulate the injected current, or bias voltage applied to at least one of the arms, with a dither signal. A phase sensitive detector is configured to detect an error in the phase of light emitted by the modulator. An operating point controller is configured to monitor the detected phase error and adjust the current injected into the imbalance arm so as to compensate for the detected error and thereby control an operating point of the modulator.

13 Claims, 3 Drawing Sheets

GAIN CONTROL FOR AN OPTICAL MODULATOR

CROSS-REFERENCE TO RELATED APPLICATIONS

This application claims benefit of United Kingdom patent application number GB 1112348.6, filed Jul. 18, 2011, which is herein incorporated by reference.

BACKGROUND OF THE INVENTION

1. Field of the Invention

The invention relates to gain control of an optical modulator. In particular, although not exclusively, the invention relates to dynamic gain control for use with control loops of a Mach-Zehnder modulator.

2. Description of the Related Art

Transmission of data using optical carriers enables very high bandwidths and numbers of multiplexed channels with low signal loss and distortion. A coherent laser light beam is amplitude or phase modulated with a data signal, and propagates to a remote receiver via a system of optical fibres and repeaters. The light beam may advantageously be modulated with electrical signals in the microwave frequency range using an electro-optic modulator such as a Mach-Zehnder modulator or optical coupler.

Mach-Zehnder electro-optic modulators are well known. An electro-optic modulator based on a Mach-Zehnder interferometer generally includes a monolithic substrate formed of an electro-optic material such as $LiNbO_3$ or InP. An optical waveguide is formed in the substrate having two arms or branches which extend generally in parallel with each other. The effective index of refraction of the material in the waveguide is higher than the index of refraction of the material of the substrate.

In the absence of an applied electrical bias voltage, an input optical or light beam produced by a laser or the like applied to the waveguide divides between the branches. The optical signals propagating through the branches recombine at the optical output of the waveguide. If the optical path lengths of the branches are equal, or differ by an integral number of wavelengths, then the optical signals recombine in phase with each other, such that their amplitudes are additive and an optical output signal which is essentially similar to the optical input signal appears at the output of the waveguide.

If the optical path lengths of the branches differ by a half integral number of wavelengths, the optical signals emerging from the branches are 180° out of phase with each other. The amplitudes of the signals combine subtractively, cancelling each other out, such that a zero output is produced at the optical output.

Application of a predetermined electrical bias voltage differential to one branch of the waveguide relative to the other branch causes the complex indices of refraction of the material in the branches to vary differently due to the electro-optic effect, such that the effective optical lengths (and absorption) of the branches vary accordingly. At a bias voltage known in the art as $V_\pi$, the effective optical lengths have varied to such an extent that the optical signals emerging from the branches are 180° out of phase compared to the situation when no bias voltage is applied. If the path lengths of an unbiased modulator are the same, then at a bias voltage of $V_\pi$ the optical signals will interfere destructively and cancel each other out, such that a zero output is produced at the optical output. If the path lengths of an unbiased modulator differ by a half integral number of wavelengths, then at a bias voltage of $V_\pi$ the optical signals will interfere constructively so that the optical output signal is essentially similar to the optical input signal. An electrical data signal, normally in the microwave frequency range, is applied to one or both of the arms. The optical carrier signal exiting the device is thus modulated by the data signal.

Phase-shift keying (PSK) is a digital modulation technique that conveys data by changing (i.e. modulating) the phase of a carrier signal instead of its amplitude. Essentially, binary digits (bits) are encoded by associating a discrete set of phases of the carrier signal with a particular pattern of bits, known as a symbol. In differential phase-shift keying (DPSK) it is the change in successive phases of the signal that is used to determine the bit pattern, rather than the actual phase of the signal at any point in time.

Binary phase-shift keying (BPSK) makes use of two distinct phases separated by 180°. However, this technique only allows for 1 bit to be encoded per symbol and so it is not suitable for high data-rate applications. Quadrature phase-shift keying (QPSK) employs four discrete phases and can be used to encode two bits per symbol by combining an in-phase wave and a quadrature-phase wave, having a phase-shift of a quarter of a wavelength with respect to the in-phase wave. Thus, QPSK can be used to significantly increase a data rate when compared to BPSK. Both BPSK and QPSK can be implemented using differential PSK to form differential BPSK (DBPSK) and differential QPSK (DQPSK), respectively.

For many optical communication applications, it is desirable to bias modulators at an "operating point" voltage $V_\pi/2$. However, device instabilities and environmental effects, especially temperature variations, cause the operating point to drift over time, and constant readjustment is required to maintain the proper operating point. When MZMs are used to encode PSK schemes, they are required to manipulate the phase of the light exiting the modulator without substantially affecting the amplitude. When this is the case, each MZM is biased for minimum optical transmission in the absence of a drive voltage (i.e. the operating point voltage is $V_\pi$), and is driven with a drive voltage $V_I(t)$, $V_Q(t)=\pm V_\pi$ to give abrupt phase shifting with a minimum of amplitude modulation.

MZMs typically used for PSK schemes generally have control loops relying on phase control transfer functions which are non-linear. They typically rely on integrated "imbalance" control electrodes within their control loops to centre the operating point of an optical signal. An imbalance electrode is integrated into each MZ arm. The imbalance electrodes can be operated single ended or differentially.

Phase change in the optical signal is achieved by injecting current into the imbalance electrode. This effectively achieves the same result as applying a change in bias voltage on a bias electrode (as described above). The amount of optical phase change per unit current (mA) is non linear. In general, the change in optical phase per mA is greatest at the lowest injection current. As the current is increased from zero, the phase change initially increases sharply with current, but as the current continues to rise the rate of change of phase change decreases.

Operation of the control loop relies on measuring an "error" introduced by an imposed dither in the optical phase. The optical phase is caused to oscillate at a predetermined rate (which is much lower than the bit rate of the transmitted signal). In order to impose the dither on the optical phase, a dither signal is applied to the bias voltage or to the current injected into the imbalance electrode. The amplitude of the dither signal is generally fixed.

The output signal from the modulator is monitored and a feedback loop adjusts the current applied to the imbalance electrode so as to correct the phase to ensure that the modulator remains at the operating point. The magnitude of phase correction in terms of current applied to the imbalance is a product of a fixed gain and the error magnitude and is therefore linear.

However, the magnitude of optical phase correction for an arbitrary change in current is not uniform for all currents injected into the imbalance electrode. The current change required to achieve any given phase correction will vary across the imbalance characteristic and is therefore non-linear. As a result, the overall loop gain will change across the characteristic. The highest gain will occur at the lowest imbalance current. It is possible that operation and transition at or across zero imbalance current may be required and there is a danger that control may be lost when the imbalance current is low.

One way to address this problem is to apply a small current offset (for example 150 μA) to the imbalance electrode on both arms. This ensures that the current is never too close to zero and "soaks up" the rapid change in phase at the lowest imbalance currents. However, a range of phase control is lost by following this route.

SUMMARY OF THE INVENTION

In accordance with one aspect of the present invention there is provided an optical modulation system for transmitting modulated optical light. The system comprises an electro-optic modulator having at least two arms through which light is transmitted, and on each of which is located a voltage bias electrode for applying bias voltage so as modify the phase of light passing through that arm. An imbalance electrode is located on at least one arm. A current source is configured to inject current into the imbalance electrode for modifying the phase of light passing through the arm. A current dither generator is configured to modulate the injected current or bias voltage with a dither signal. A phase sensitive detector is configured to detect an error in the phase of light emitted by the modulator. An operating point controller is configured to monitor the detected phase error and adjust the current injected into the imbalance arm so as to compensate for the detected error and thereby control an operating point of the modulator, the required current adjustment being determined by multiplying the detected phase error by a gain. The gain is modified by a compensation function selected to compensate for a non-linear relationship between the phase in the arm and the current supplied to the imbalance electrode.

The relationship between the phase of light passing through the arm and the current supplied to the imbalance electrode may be modelled by a polynomial function or other characteristic, and wherein the compensation function may be a scaled inverse of the polynomial function.

The compensation function may be selected to compensate for the rate of change of the phase in the arm with respect to the current supplied to the imbalance electrode. The compensation function may be selected to reduce the gain at low imbalance electrode currents compared to the gain at high imbalance electrode currents.

The compensation function may be preselected and stored in firmware associated with the operating point controller. Alternatively, the system may be configured to adapt the compensation function dynamically in response to changes over time in the relationship between the phase in the arm and the current supplied to the imbalance electrode.

The invention also provides an electro-optic system for transmitting a phase modulated optical signal, the electro-optic signal comprising a modulation system as described above.

The electro-optic system of claim may be configured to operate phase shift keying, and the modulation system may be included in an inner modulator, outer modulator or pulse carver of the electro-optic system.

In accordance with another aspect of the present invention there is provided a method for controlling current injected into an imbalance electrode located on an arm of an electro-optic modulator, where the injected current modifies the phase of light passing through the imbalance arm. The method comprises modulating the injected current or a bias voltage applied to the arm with a dither signal, detecting an error in the phase of light emitted by the modulator, and adjusting the current injected into the imbalance arm so as to compensate for the detected error and thereby control an operating point of the modulator. The required current adjustment is determined by multiplying the detected phase error by a gain, and the gain is modified by a compensation function selected to compensate for a non-linear relationship between the phase in the arm and the current supplied to the imbalance electrode.

The invention further provides a computer program, comprising computer readable code which, when run by a device, causes the device to perform the method described above.

The invention also provides a computer program product comprising a computer readable medium and the computer program described above, wherein the computer program is stored on the computer readable medium.

BRIEF DESCRIPTION OF THE DRAWINGS

Some preferred embodiments of the invention will now be described by way of example only and with reference to the accompanying drawings, in which.

DETAILED DESCRIPTION

Figure 1:
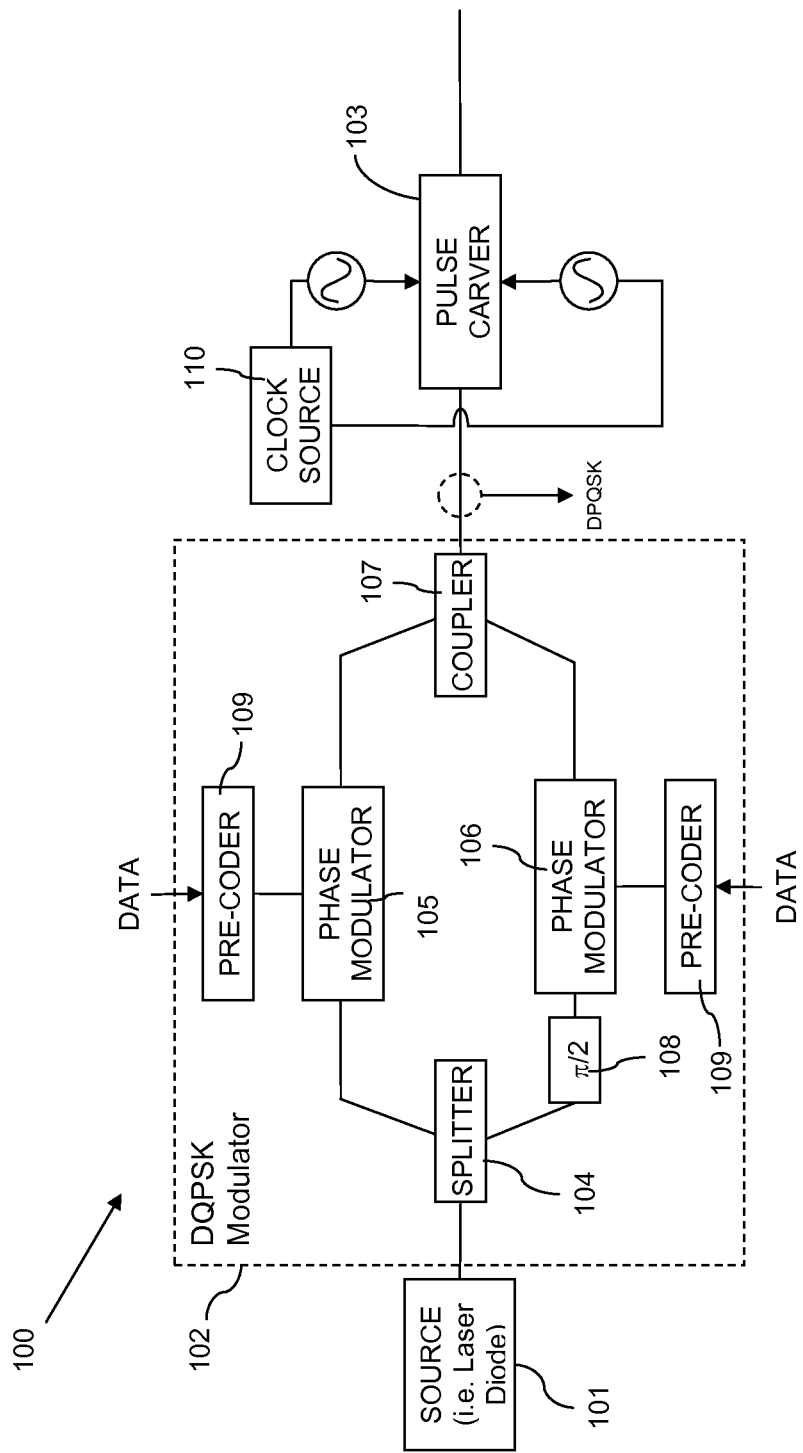
FIG. 1 is a schematic illustration of an exemplary DQPSK transmitter.

FIG. 1 is a schematic illustration of an exemplary DQPSK transmitter 100. The transmitter comprises a source 101 (e.g. a laser diode), a DQPSK modulator 102 and a pulse carver 103 driven by a clock source 110. The DQPSK modulator 102 comprises an input splitter 104 feeding two phase modulators 105, 106 arranged in parallel, and an output coupler 107. The phase modulators 105, 106 can be provided by two nested Mach-Zehnder Modulators (MZM). One arm of the DQPSK modulator 102 is also provided with a further quadrature phase modulator 108. The source 101 generates an optical carrier wave which is split by the splitter 104 and equally distributed to the two phase modulators 105, 106. The quadrature phase modulator 108 introduces a π/2) (90° phase shift between the two optical signals using an imbalance electrode, which puts the signals in quadrature to each other (i.e. such that they form separate I and Q components). Each of the phase modulators 105, 106 is driven by one of two binary drive signals generated by a pre-coder 109. The pre-coder 109 converts the data streams that are to be encoded into the relevant in-phase (I) and quadrature (Q) phase drive signals, with one of the two phase modulators being driven by the I drive signal whilst the other is driven by the Q drive signal. The two optical signals are then combined in the output coupler 107 resulting in one of the four phase shifted symbols (i.e. π/4, π/4, π/4 and π/4) of a DQPSK signal.

The pulse carver 103 is then used to carve pulses out from the DQPSK signal. It will be appreciated that the pulse carver 103 could also be placed before the DQPSK modulator 102. The pulse carver is typically a MZM that is driven by a clock source providing sinusoidal electrical clock signals. It will also be appreciated that some applications may operate without a pulse carver.

As previously discussed, MZMs typically used for PSK schemes generally have control loops relying on non-linear phase control transfer functions. They typically rely on integrated "imbalance" control electrodes within their control loops to centre the operating point of an optical signal. An imbalance electrode is integrated into each MZ arm. The imbalance electrodes can be operated single ended or differentially.

Figure 2:
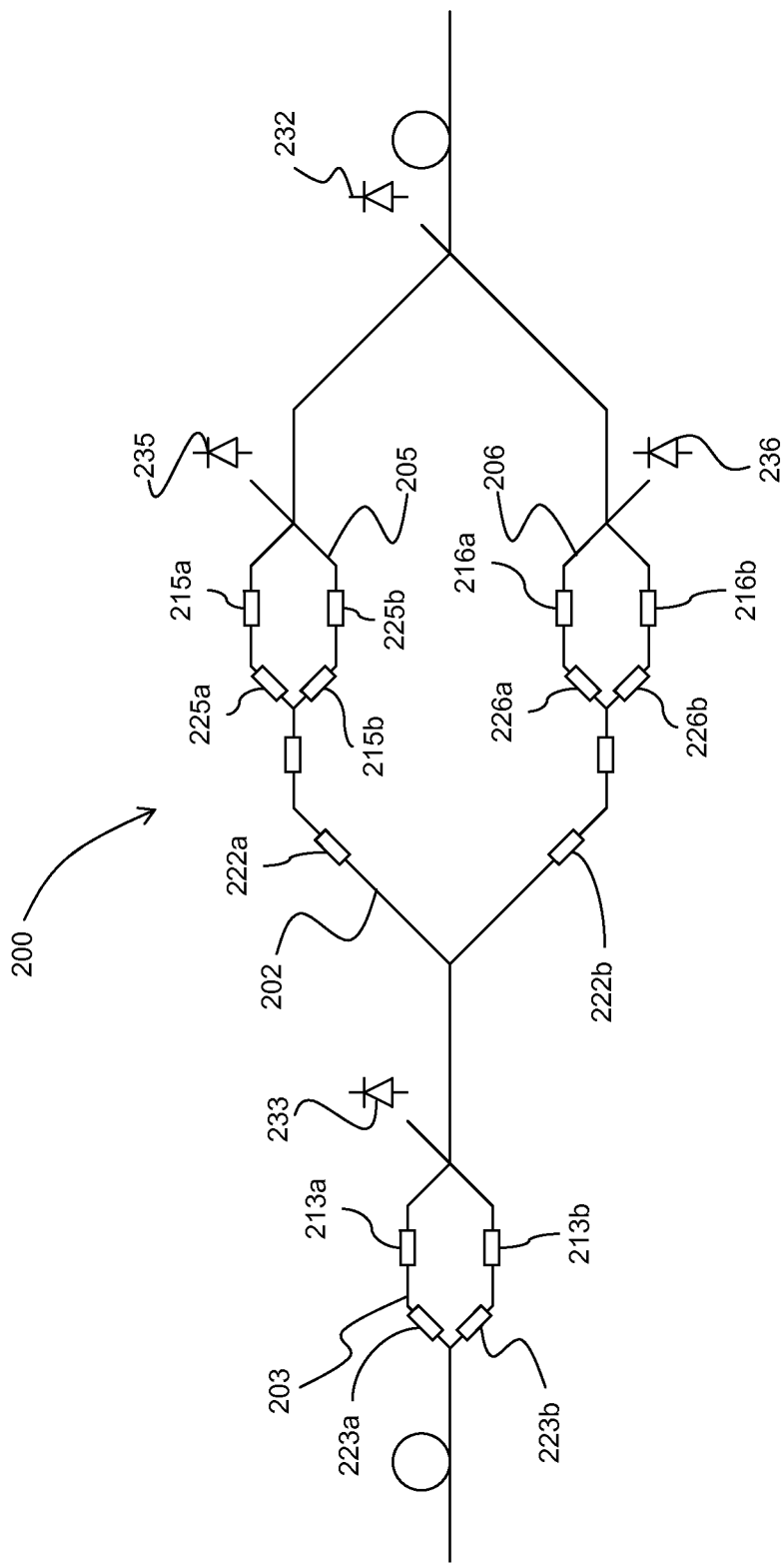
FIG. 2 is a schematic illustration of an alternative exemplary DQPSK transmitter.

FIG. 2 is a schematic diagram of a transmitter 200, similar to the transmitter 100 shown in FIG. 1, illustrating typical locations for bias voltage electrodes and imbalance electrodes. The transmitter 200 includes an outer loop (DQPSK modulator) 202 for maintaining quadrature, top and bottom inner loops 205, 206 for maintaining null, and a pulse carver loop 203 (in this example located before the modulator 202). Each loop consists of two arms, over each of which is located a bias voltage electrode, 213*a,b*, 215*a,b*, 216*a,b* and imbalance electrode 222*a,b*, 223*a,b*, 225*a,b*, 226*a,b*. A phase detector 232, 233, 235, 236 is provided at the output to each loop.

Bias voltages are applied to the voltage bias electrodes 213*a*, 213*b* of the pulse carver loop 203 and a differential sinusoid RF signal is applied to the electrodes to provide the pulse carver signal. The imbalance electrodes 223*a*, 223*b* are used to centre the RF signal at the correct operating point using a combination of the dither applied to either the imbalance electrodes 223*a*, 223*b* or to the voltage bias electrodes 213*a*, 213*b* and the phase detector 233.

The inner modulation loops 205, 206 operate in the same way but have encoded data applied to the voltage bias electrodes instead of an RF sinusoid.

The outer MZ loop 202 maintains quadrature by applying the required adjustment to the current electrodes 222*a*, 222*b* using the feedback from the detector 232.

Phase change in the optical signal is achieved by injecting current into the imbalance electrode. In order to ensure that the modulator is maintained at the operating point, a dither is imposed on the current supplied to the imbalance electrode or on the voltage applied to the bias voltage electrodes. The phase sensitive detectors monitor the corresponding dither in the output of the modulator, and detects any error in the optical phase. A feedback loop corrects the current supplied to the imbalance electrode in response to the measured error.

Figure 3:
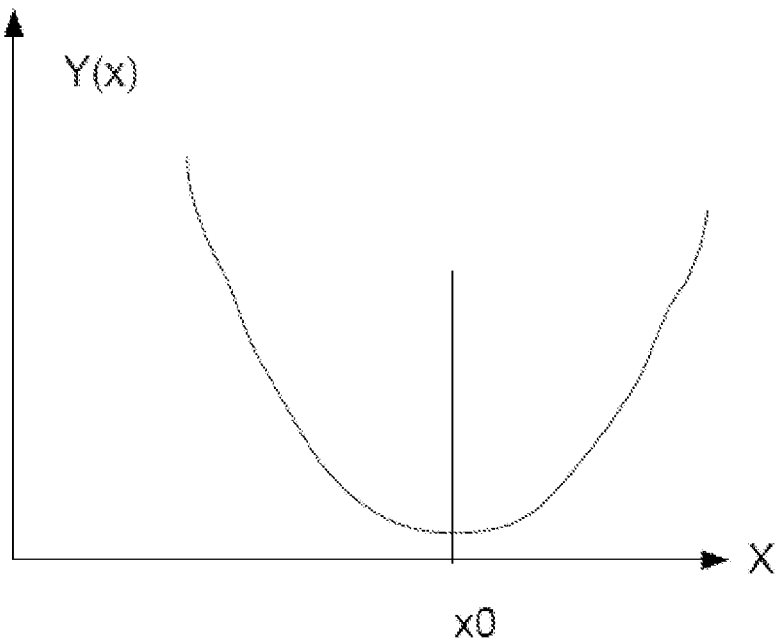
FIG. 3 is an illustration of a function y(x) having a minimum operating point.

The operation of the feedback loop is based on an "extremum seeking loop", as described, for example, in "Real-Time Optimization by Extremum-Seeking Control, K. B. Ariyur & M. Krstic, Pub: John Wiley 2003 ISBN 0-471-46859-2. The objective of an extremum seeking loop with integral feedback is to locate an operating point close to an extreme value (i.e minimum or maximum) of a measurable target function such as the point x0 in FIG. 3, which shows a function y(x).

Close to the operating point the 1st derivative of y is zero. y(x) can therefore be expanded as a Taylor series about x0 as follows:

$$y(x)=y(x0)+\tfrac{1}{2}(x-x0)2f''(x0)+\text{higher terms}$$

Applying a discrete dither signal of +/−d onto x and detecting the change in y yields:

$$\delta y = 2(x-x0)d\,f''(x0)$$

At each iteration of a digital integrator the feedback loop multiplies the above by a gain term G and adds it to the operating point to converge on the local extremum. It can therefore be shown that the operating points follow a geometric series:

$$\begin{aligned}(x-x0)_n &= (x-x0)_{n-1} + 2df''(x0)G(x-x0)_{n-1}\\ &= (1+2df''(x0)G)(x-x0)_{n-1}\\ &= (1+2df''(x0)G)2(x-x0)_{n-2}\\ &\vdots\\ &= (1+2df''(x0)G)n(x-x0)_0\end{aligned}$$

For the operating point to converge the modulus of the common factor (1+2 d f''(x0) G) must be less than unity else a divergent series will be created producing unstable behaviour. The product of G and the second derivative must be negative for negative feedback, and there is thus a stability criteria of:

$$|df''(x0)G|<1 \text{ for stable convergence}$$

Given the difficulty of quantifying dynamic 2nd derivative parameters and their key role in determining loop stability margins the "Extremum searching" theory can be used to provide an adaptive control scheme. As discussed above, close to the operating point the 1st derivative of y is zero and y(x) can be expanded as a Taylor series about x0:

$$y(x)=y(x0)+\tfrac{1}{2}(x-x0)2f''(x0)+\text{higher terms}$$

It is possible to obtain a real time estimate of the second derivative f'' by applying a discrete dither signal of +/−d onto x and computing the following term:

$$d2.f''=2y(x0)-y(x0+d)-y(x0-d)$$

This can be used to update the value of integrator gain on a sample by sample basis or can be done as part of an initial calibration procedure. It is not recommended to continually update non volatile stored parameters (such as dither & gain defaults) because of the write cycle wearout limits of Flash EEPROM cells. Additionally the calculation of optimum gain may require floating point division which can lead to excessive CPU cycle requirements slowing down the maximum sampling rate with low cost microcontrollers. However calculating the optimum gain in the calibration GUI and setting the default gain level is feasible. This would require the collection of ADC sample data for offline processing.

Figure 4:
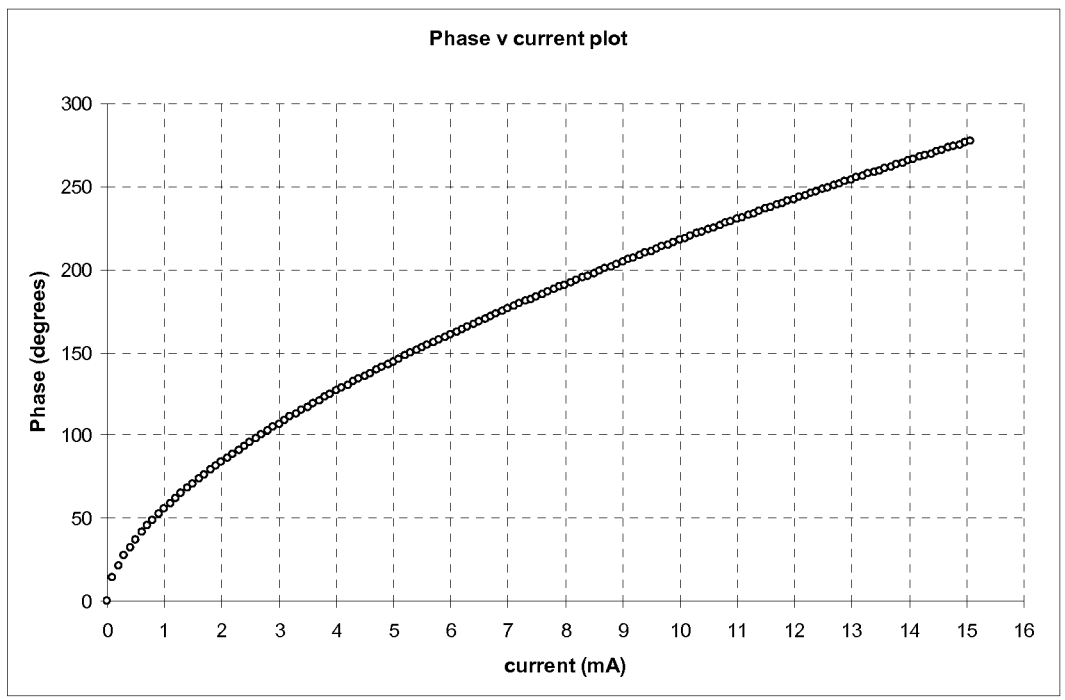
FIG. 4 is an illustration of a typical imbalance characteristic.

The amount of optical phase change per unit current (mA) is non linear and can be described by a polynomial or other characteristic. In general, the change in optical phase per mA is greatest at the lowest injection current. As the current is increased from zero, the phase change initially increases sharply with current, but as the current continues to rise the rate of change of phase change decreases. This can be understood with reference to FIG. 4, which illustrates how a typical imbalance characteristic—i.e. how phase change varies with current.

The current change required to achieve any given phase correction therefore varies across the imbalance characteristic and is therefore non linear. As a result, the overall loop gain will change across the characteristic. The highest gain will occur at the lowest imbalance current. To prevent this happening, an adaptive control is implemented to reduce the loop firmware gain at low imbalance currents. Using test or simulation data, a constant loop gain can be maintained across the whole imbalance control range by modifying the firmware gain dependent on the phase per mA at a specific imbalance current.

Test data on a population of devices can be used to produce a model of the phase per mA response of the imbalance characteristic. The model can be in the form of a polynomial or other function and is able to describe any characteristic within the population dependent on the coefficients used. For a particular device, spot measurements or some other measurement method can be used to define the model coefficients for that device. Once the device has been defined by the required coefficients it is possible to calculate the rate of change of phase of the imbalance electrode at any drive current.

In order to maintain loop control, the loop correction factor in terms phase needs to be constant across the imbalance range. Using the model, the loop correction in terms of drive current can be modified according to the magnitude of the imbalance current in order to maintain a constant correction in terms of phase.

Thus an algorithm can be produced using the coefficients for a particular device to provide a constant phase correction factor across the imbalance current range.

Used in combination with the control loop, this algorithm will maintain the overall loop gain irrespective of the imbalance drive current.

Thus the approach described above can be used to compensate for the change in gain due to the imbalance characteristic. An inverse polynomial or other characteristic may be tailored to the imbalance characteristic. The control loop internal gain may be modified according to the inverse polynomial across the range, so as to keep the overall loop gain constant across the whole imbalance range. The inverse polynomial characteristic can be calculated taking spot measurements per device. The inverse polynomial characteristic can be calculated for a population. Overall, compensation can be provided for the non linear affect of each imbalance electrode While the foregoing is directed to embodiments of the present invention, other and further embodiments of the invention may be devised without departing from the basic scope thereof, and the scope thereof is determined by the claims that follow.

The invention claimed is:

1. An optical modulation system for transmitting modulated optical light, comprising:
   an electro-optic modulator having at least two arms through which light is transmitted;
   a voltage bias electrode located on each arm for applying bias voltage to that arm for modifying the phase of light passing through that arm;
   an imbalance electrode located on at least one arm;
   a current source for injecting current into the imbalance electrode for modifying the phase of light passing through the arm;
   a dither generator for modulating the injected current or bias voltage with a dither signal;
   a phase sensitive detector for detecting an error in the phase of light emitted by the modulator; and
   an operating point controller for monitoring the detected phase error and adjusting the current injected into the imbalance arm so as to compensate for the detected error and thereby control an operating point of the modulator, the required current adjustment being determined by multiplying the detected phase error by a gain;
   wherein the gain is modified by a compensation function selected to compensate for a non-linear relationship between the phase in the arm and the current supplied to the imbalance electrode, and
   the compensation function is selected to reduce the gain at low imbalance electrode currents compared to the gain at high imbalance electrode currents.

2. The system of claim 1, wherein the relationship between the phase of light passing through the arm and the current supplied to the imbalance electrode is modelled by a polynomial function, and wherein the compensation function is an inverse of the polynomial function.

3. The system of claim 1, wherein the compensation function is selected to compensate for the rate of change of the phase in the arm with respect to the current supplied to the imbalance electrode.

4. The system of claim 1, wherein the compensation function is preselected and stored in firmware associated with the operating point controller.

5. The system of claim 1, configured to adapt the compensation function dynamically in response to changes over time in the relationship between the phase in the arm and the current supplied to the imbalance electrode.

6. An electro-optic system for transmitting a phase modulated optical signal comprising the modulation system of claim 1.

7. The electro-optic system of claim 6 configured to operate phase shift keying, wherein the modulation system is included in an inner modulator, outer modulator or pulse carver of the electro-optic system.

8. A method for controlling current injected into an imbalance electrode located on an arm of an electro-optic modulator, the injected current modifying the phase of light passing through the imbalance arm, the method comprising:
   modulating the injected current or a bias voltage applied to the arm with a dither signal;
   detecting an error in the phase of light emitted by the modulator; and
   adjusting the current injected into the imbalance arm so as to compensate for the detected error and thereby control an operating point of the modulator, the required current adjustment being determined by multiplying the detected phase error by a gain;
   wherein the gain is modified by a compensation function selected to compensate for a non-linear relationship between the phase in the arm and the current supplied to the imbalance electrode, and
   the compensation function reduces the gain at low imbalance electrode currents compared to the gain at high imbalance electrode currents.

9. The method of claim 8, wherein the relationship between the phase of light passing through the arm and the current supplied to the imbalance electrode is modelled by a polynomial function, and wherein the compensation function is an inverse of the polynomial function.

10. The method of claim 8, wherein the compensation function compensates for the rate of change of the phase in the arm with respect to the current supplied to the imbalance electrode.

11. The method of claim 8, further comprising preselecting the compensation function and storing it in firmware.

12. The method of claim 8, further comprising adapting the compensation function dynamically in response to changes over time in the relationship between the phase in the arm and the current supplied to the imbalance electrode.

13. A non-transitory computer-readable storage medium storing executable computer program instructions for controlling current injected into an imbalance electrode located on an arm of an electro-optic modulator, the injected current modifying the phase of light passing through the imbalance arm, the instructions executable to perform steps comprising:
- modulating the injected current or a bias voltage applied to the arm with a dither signal;
- detecting an error in the phase of light emitted by the modulator; and
- adjusting the current injected into the imbalance arm so as to compensate for the detected error and thereby control an operating point of the modulator, the required current adjustment being determined by multiplying the detected phase error by a gain;
- wherein the gain is modified by a compensation function selected to compensate for a non-linear relationship between the phase in the arm and the current supplied to the imbalance electrode, and
- the compensation function reduces the gain at low imbalance electrode currents compared to the gain at high imbalance electrode currents.

* * * * *